(12) United States Patent
Supino

(10) Patent No.: US 6,629,089 B1
(45) Date of Patent: Sep. 30, 2003

(54) ARTIFICIAL NEURAL NETWORK VOICE COIL MOTOR CONTROLLER

(75) Inventor: Lou Supino, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 507 days.

(21) Appl. No.: 09/672,004

(22) Filed: Sep. 29, 2000

(51) Int. Cl.[7] .................. G06F 15/18; G05B 13/02; G11B 21/02

(52) U.S. Cl. ............... 706/23; 706/15; 706/22; 706/903; 700/48; 700/45; 700/37; 360/75; 369/44.25

(58) Field of Search ............... 706/15, 23, 22, 706/903; 700/48, 45, 37; 360/75, 77.01, 77.05, 264.7, 266.4; 369/44.25, 53.28

(56) References Cited

U.S. PATENT DOCUMENTS

| | | | | |
|---|---|---|---|---|
| 5,220,466 A | * | 6/1993 | Coker et al. ............... | 360/46 |
| 5,268,834 A | * | 12/1993 | Sanner et al. .............. | 700/31 |
| 5,311,421 A | * | 5/1994 | Nomura et al. ............ | 700/37 |
| 5,471,381 A | * | 11/1995 | Khan ......................... | 700/48 |
| 5,519,605 A | * | 5/1996 | Cawlfield .................. | 700/31 |
| 5,585,976 A | * | 12/1996 | Pham ........................ | 360/77.04 |
| 5,677,609 A | * | 10/1997 | Khan et al. ................ | 318/561 |
| 5,704,011 A | * | 12/1997 | Hansen et al. ............. | 706/25 |
| 5,877,954 A | * | 3/1999 | Klimasauskas et al. .... | 700/29 |
| 5,909,419 A | * | 6/1999 | Kamiyama ................. | 369/53.23 |
| 5,966,357 A | * | 10/1999 | Ryoo ........................ | 369/53.23 |
| 6,064,997 A | * | 5/2000 | Jagannathan et al. ...... | 706/23 |
| 6,111,832 A | * | 8/2000 | Tsuchiya et al. .......... | 369/53.23 |
| 6,185,171 B1 | * | 2/2001 | Bassett et al. ............. | 369/53.18 |
| 6,212,664 B1 | * | 4/2001 | Feygin et al. ............. | 714/796 |
| 6,314,473 B1 | * | 11/2001 | Singer et al. .............. | 710/5 |
| 6,385,711 B1 | * | 5/2002 | Colligan ................... | 711/170 |
| 6,545,836 B1 | * | 4/2003 | Ioannou et al. ........... | 360/77.06 |
| 6,560,658 B2 | * | 5/2003 | Singer et al. .............. | 710/5 |
| 6,571,310 B1 | * | 5/2003 | Ottesen et al. ............ | 711/5 |
| 6,574,754 B1 | * | 6/2003 | Smith ....................... | 714/47 |
| 2001/0052035 A1 | * | 12/2001 | Singer et al. .............. | 710/5 |
| 2002/0041460 A1 | * | 4/2002 | Singer ...................... | 360/69 |
| 2003/0051097 A1 | * | 3/2003 | Ottesen et al. ........... | 711/112 |

OTHER PUBLICATIONS

Wang et al., "Compact Neural Network Detector for Hard–Disk Drive Using Zero–Forcing Preprocessing", Proceedings of the 1998 IEEE International Symposium on Circuits and Systems, vol. 3, pp. 9–12, May 1998.*

(List continued on next page.)

*Primary Examiner*—John Follansbee
*Assistant Examiner*—Kelvin Booker
(74) *Attorney, Agent, or Firm*—Robert P. Bell; Dan Shifrin; Steven Lin

(57) ABSTRACT

A robust Artificial Neural Network controller is proposed for the motion control of a magnetic disk drive voice coil motor (voice coil motor). The neural controller is used to approximate the nonlinear functions (actuator electromechanical dynamics) of the voice coil motor while having on line training. One main advantage of this approach, when compared with standard adaptive control, is that complex dynamical analysis is not needed. Using this design, not only strong robustness with respect to uncertain dynamics and non-linearities can be obtained, but also the output tracking error between the plant output and the desired reference can asymptotically converge to zero. Additionally, standard offline training, utilizing training vectors to stimulate the voice coil motor, is not required.

24 Claims, 6 Drawing Sheets

OTHER PUBLICATIONS

Baird et al., "MP 2.3 A Mixed–Signal 120M Sample/s PRML Solution for DVD Systems", 1999 IEEE International Solid–State Circuits Conference, Feb. 1999..*

Weerasooriya et al., "Adaptive Time Optimal Control of a Disk Drive Actuator", IEEE Transactions on Magnetics, vol. 30, No. 6 pp. 4224–4226, Nov. 1994.*

Iwata et al., "Time Optimal Control Using PI–Sigma Networks", IEEE International Conference on Neural Networks, vol. 1, pp. 546–551, Mar. 1993.*

Wang, Gou–Jen, "Neural–Network Approach for Computer Disk Drive Control System", IEEE International Workshop on Emerging Technologies and Factory Automation, pp. 271–276, Aug. 1992.*

Neifeld et al., "Optical Disks in Optical Computing", Digest of Papers, COMPCON Spring 1991, pp. 442–447, Feb. 1991.*

* cited by examiner

ARTIFICIAL NEURAL NETWORK VOICE COIL MOTOR CONTROLLER

FIELD OF THE INVENTION

The present invention is generally related to the field of Artificial Neural Network based control systems. The invention provides a method of Artificial Neural Network training without the need of an offline learning phase and training vectors.

BACKGROUND OF THE INVENTION

Moore's law has long been cited as the prime mover in the information technology revolution. Now this revered law may have to share the spotlight with another, equally important phenomenon: the amazing growth of areal densities in the storage industry.

Driven by the increasingly rich content of files, easy access to Internet downloads and data collected by corporate web sites (not to mention the pervasive reluctance among users to delete old e-mail files), the need for storage capacity is growing at rates estimated as high as 100% per year.

Luckily for corporate space planners, areal density is keeping pace with the need. *Data Storage Magazine* reports annual increases of 60 w, with 100% increases projected in the near future. Maintaining such increases in a highly price-competitive environment puts tremendous pressure on every aspect of disk drive technology. Given the relentless market pressure to increase areal density by at least 60% annually and the problems associated with increasing linear bit densities (bpi), considerable interest has been focused on radial track density (tpi).

Magnetic disk drive motion control design has been dominated by classical control techniques. While this tradition has produced many effective control systems, recent developments in radial track density and micro-actuators, have forced a growing interest in robust, nonlinear and artificial intelligence control.

Disk drives store data on constantly spinning disks made of aluminum or glass and coated on both sides with a thin film of magnetic material. Magnetic read/write heads store data on both sides of the disk by magnetizing very small areas on the disk surface in closely spaced, concentric tracks. A positioning device called an actuator or, voice coil motor, moves the heads rapidly from one track to another by the servo control system. An example of such Prior Art disk drive architecture is disclosed, for example in C. Denis Mee, *Magnetic Recording*, McGraw Hill Inc., 1988, incorporated herein by reference.

The expected increase in track density places an extra burden on the servo control system, which must hold the off-track motion of the heads within increasingly tighter limits for errorless reading and writing. This limit, known as track mis-registration (TMR), amounts to about 10% of the total track width. At today's average track density of 25000 tracks per inch, the TMR budget is approximately four micro-inches. This implies eliminating as much as possible, any disturbance that might cause the head to move off track.

The major causes of off-track disturbances include Non-repeatable runout from the spindle bearing, Residual vibrations due to actuator modes, Servo writer errors, Nonlinear friction effects from the VCM bearings, Slipped disks, leading to repeatable runout, and Casting warpage.

The servo bandwidth frequency provides a measure of how well the control system will dampen the effects of off-track disturbances.

Voice coil motor control can be classified into two basic problems: tracking a reference trajectory, (seeking) and track following. Several linear controllers as well as non-linear controllers have been proposed in the Prior Art for solving these problems. The main idea behind these control systems is to achieve suitable bandwidth to obtain the track density required by the marketplace.

Artificial Neural Networks are known in the art. Although Artificial Neural Networks have been around since the late 1950's, it wasn't until the mid-1980's that algorithms became sophisticated enough for general applications. Today, Artificial Neural Networks are being applied to an increasing number of real-world problems of considerable complexity. They are good pattern-recognition engines and robust classifiers, with the ability to generalize in making decisions about imprecise input data. They offer ideal solutions to a variety of classification problems such as speech, character and signal recognition, as well as functional prediction and system modeling where the physical processes are not understood or are highly complex.

Artificial Neural Networks may also be applied to control problems, where the input variables are measurements used to drive an output actuator, and the network learns the control function. The advantage of Artificial Neural Networks lies in their resilience against distortions in the input data and their capability of learning. They are often good at solving problems that are too complex for conventional methods and are often well suited to problems that people are good at solving, but for which traditional methods are not.

In its most general form, an Artificial Neural Network is a machine that is designed to model the way in which the brain performs a particular task. Artificial neural networks are collections of mathematical models that emulate some of the observed properties of biological nervous systems and draw on the analogies of adaptive biological learning. The key element of the Artificial Neural Network paradigm is the novel structure of the information processing system. It is composed of a large number of highly interconnected processing elements that are analogous to neurons and are tied together with weighted connections that are analogous to synapses.

Learning in biological systems involves adjustments to the synaptic connections that exist between the neurons. This is true of Artificial Neural Networks as well. Learning typically occurs by example through training, or exposure to a training set of input/output data where the learning algorithm iteratively adjusts the connection weights. These connection weights store the knowledge necessary to solve specific problems.

There are many different types of Artificial Neural Networks. Some of the more common include the multilayer perceptron which is generally trained with the back-propagation of error algorithm, learning vector quantization, radial basis function, Hopfield, and Kohonen, to name a few. Some Artificial Neural Networks are classified as feedforward while others are recurrent depending on how data is processed through the network.

Another way of classifying Artificial Neural Network types is by their method of learning, as some Artificial Neural Networks employ supervised training while others are referred to as unsupervised or self-organizing. Supervised training is analogous to a student being guided by an instructor. Unsupervised algorithms essentially perform clustering of the data into similar groups based on the measured attributes or features serving as inputs to the algorithms. This is analogous to a student who derives the lesson totally on his or her own. Artificial Neural Networks can be implemented in software or in specialized hardware.

FIG. 1 illustrates the general architecture of a two layer artificial neural network. The left layer represents the input layer, in this case with three inputs nodes 110, 120, and 130 receiving inputs X1 through X3. The middle layer is called the hidden layer, with five nodes 140, 150, 160, 170, 180, and 190. It is this hidden layer which performs much of the work of the network. The output layer in this case has one node 190 outputting signal Y1 representing output values determined from the inputs.

Each node 140, 150, 160, 170, and 180 in the hidden layer may be fully connected to the input nodes 110, 120, and 130. That means what is learned in a hidden node is based on all the inputs taken together. This hidden layer is where the network "learns" interdependencies in the model. FIG. 2 provides some detail into what goes on inside a hidden node.

As illustrated in FIG. 2, a weighted sum 210 may be performed as follows: X1 times W1 plus X2 times W2 and so on through X3 and W3. This weighted sum is performed for each hidden node and each output node and is how interactions are represented in the network. Each summation is then transformed using activation function 220 before the value is passed on to the next layer. The activation function translates the weighted input into a value which may be used as an input to a next step or portion of the neural network.

Examples of activation functions include a linear function 230, a clipped linear function 240, and a Gaussian distribution 250. Of course, other types of functions may be applied in activation function block 220. However, in general, neural networks work best with activation functions with limited dynamic ranges.

In the human brain, information is passed between the neurons in form of electrical stimulation along the dendrites. If a certain amount of stimulation is received by a neuron, it generates an output to all other connected neurons and so information takes its way to its destination where some reaction will occur. If the incoming stimulation is too low, no output is generated by the neuron and the information's further transport will be blocked. A further description of the operation of neural networks may be found in S. Haykin, *Neural Networks: A Comprehensive Foundation.* Macmillan, NY, 1994, incorporated herein by reference.

Neural nets try to simulate the human brain's ability to learn. Unlike the biological model, an artificial neural network generally has an unchangeable structure, built of a specified number of neurons and a specified number of connections between them, which have certain values (weights). What may change during the learning process are the values of those weights. Incoming information exceeds a specified threshold value of certain neurons that pass the information to connected neurons or prevent further transportation along the weighted connections. The value of a weight will be increased if information should be transported and decreased if not. While learning different inputs, the weight values are changed dynamically until their values are balanced, so each input will lead to the desired output.

The training of a neural net results in a matrix that holds the weight values between the neurons. Once a neural net had been trained correctly, it will be able to find the desired output to a given input that had been learned, by using these matrix values.

For control engineers, the approximation capability of artificial neural networks is usually used for system identification. However there is very little about the use of Artificial Neural Networks in closed loop controllers that yield guaranteed performance. A problem with the use of Artificial Neural Networks in control applications is the uncertainty of how to initialize the Artificial Neural Network weights, which leads to the necessity of offline tuning. See, e.g., T. Yamada, Remarks on a learning type self-tuning neural network controller, Int. Conf. Adv Robotics, 1993, pp 43–48, and F. C. Chen, Adaptive Control of nonlinear systems using Neural networks, IEEE Control Systems Magazine, vol 55 no. 6, pp. 1299–1317, 1992, both of which are incorporated herein by reference.

Additionally, the processing requirements of Artificial Neural Networks for a voice coil motor control system, until recently, has been prohibitive. New high-performance 32-bit processors such as the ARM7 and ARM9 logic cores used in the Cirrus Logic 3Ci platform, the industry's most-advanced mixed-signal system-on-a-chip for magnetic hard disk drives, are playing a major role in enabling the recent developments in motion control. With these processors and associated support peripherals, sophisticated algorithms from modern control theory, nonlinear control and AI control can be implemented in realtime, and the effective control bandwidth can be pushed to higher limits.

Traditional controller design usually involves complex mathematical analysis and yet has many difficulties in controlling highly nonlinear plants. These nonlinearities are due in part to VCM bearing friction and electro-mechanical properties of the motor and power driver. The use of the learning ability of a neural network helps control design to be rather flexible, especially where plant dynamics are complex and highly nonlinear. This is a distinct advantage over traditional methods.

Artificial Neural Network voice coil motor controllers are known in the art (e.g., Khan, U.S. Pat. No. 5,471,381, issued Nov. 28, 1995 and incorporated herein by reference). However, such conventional Artificial Neural Network controllers may have to be trained such that they learn the characteristics of the plant or the plant and controller combination. Learning typically occurs by example through training, or exposure to a training set of input/output data where the learning algorithm iteratively adjusts the connection weights.

These connection weights store the knowledge necessary to solve specific problems. However, the use of Artificial Neural Networks in a control system application has limitations with respect to its practicality. The general learning phase as illustrated in FIG. 2 is very broad. To achieve maximal generalized learning, rigorous learning in the form of using many sets of training patterns may be required.

In order to train a neural network to perform some task, the weights of each unit may need to be adjusted in such a way that the error between the desired output and the actual output is reduced. This process requires that the neural network compute the error derivative of the weights (EW). In other words, it must calculate how the error changes as each weight is increased or decreased slightly. The back propagation algorithm is the most widely used method for determining the EW.

The back-propagation algorithm is easiest to understand if all the activation functions in the network are linear. The algorithm computes each EW by first computing the EA, the rate at which the error changes as the activity level of a unit is changed. For output units, the EA is simply the difference between the actual and the desired output.

To compute the EA for a hidden unit in the layer just before the output layer, all the weights between that hidden unit and the output units to which it is connected are first identified. Those weights may then be multiplied the EAs of those output units and add the products. This sum equals the EA for the chosen hidden unit.

After calculating all the EAs in the hidden layer just before the output layer, the EAs of other layers may be computed in like fashion the EAs for other layers, moving from layer to layer in a direction opposite to the way activities propagate through the network. This is what gives back propagation its name. Once the EA has been computed for a unit, it is straightforward to compute the EW for each incoming connection of the unit. The EW is the product of the EA and the activity through the incoming connection.

Note that for non-linear units, the back-propagation algorithm includes an extra translation step. Before back-propagating, the EA must be converted into the EI, the rate at which the error changes as the total input received by a unit is re changed.

Due to the complexities of off-line training and weight initialization, it would therefore be desirable to have an Artificial Neural Network based control system that does not require this specialized learning phase and have a stable system when the weight are initialized to zero. Thus, a need exists in the Prior Art for an artificial neural network voice coil motor controller system which does not require a learning phase in order to operate properly.

SUMMARY OF THE INVENTION

An Artificial Neural Network control system is derived using VCM control techniques. This means that the neural network weights are tuned online, implying that no offline learning is needed. Additionally, constant stimulus of the plant is not required for the Artificial Neural Network to learn online as is true for some adaptive systems as well as Real Time Recurrent Learning. The control system ensures good performance during the initial period if the neural network weights are initialized to zero. Tracking performance is guaranteed using a Lyapunov approach, even though there do not exist ideal weights, such that the neural net perfectly reconstructs the required nonlinear function.

The control system is comprised of an Artificial Neural Network incorporated into a VCM dynamical system, where the structure comes from some error notations standard in VCM control. Unlike adaptive VCM control, where a regression matrix must be computed from the dynamics of the structure, the basis functions for the Artificial Neural Network controller can be derived from the physics of the VCM structure.

The present invention uses an Artificial Neural Network controller in solving the tracking problems associated with the nonlinear properties of the voice coil motor of a magnetic disk drive. The present invention provides a method and apparatus for training an Artificial Neural Network based controller in the normal mode of operation, (i.e., without the need for a specialized learning phase). The resulting Artificial Neural Network control system weight update algorithm overcomes many of the inherent difficulties associated with the standard Artificial Neural Network control architectures.

The approach of the present invention uses the error states of the system to modify the weights. As the error states approach zero, the weight changes approach zero. The present invention is particularly novel when compared to conventional supervised learning methods which use training sets of input-output pairs and gradient-descent methods for weight update algorithms. Examples of such conventional supervised learning methods are disclosed, for example, in B. Kosko, *Neural Networks and Fuzzy Systems*, 1992, and C. S. George Lee, *Neural Fuzzy Systems*, 1996, both of which are incorporated herein by reference.

Additionally, the control system of the present invention is stable when the initial weights are set to zero.

DETAILED DESCRIPTION OF THE INVENTION

Figure 1:
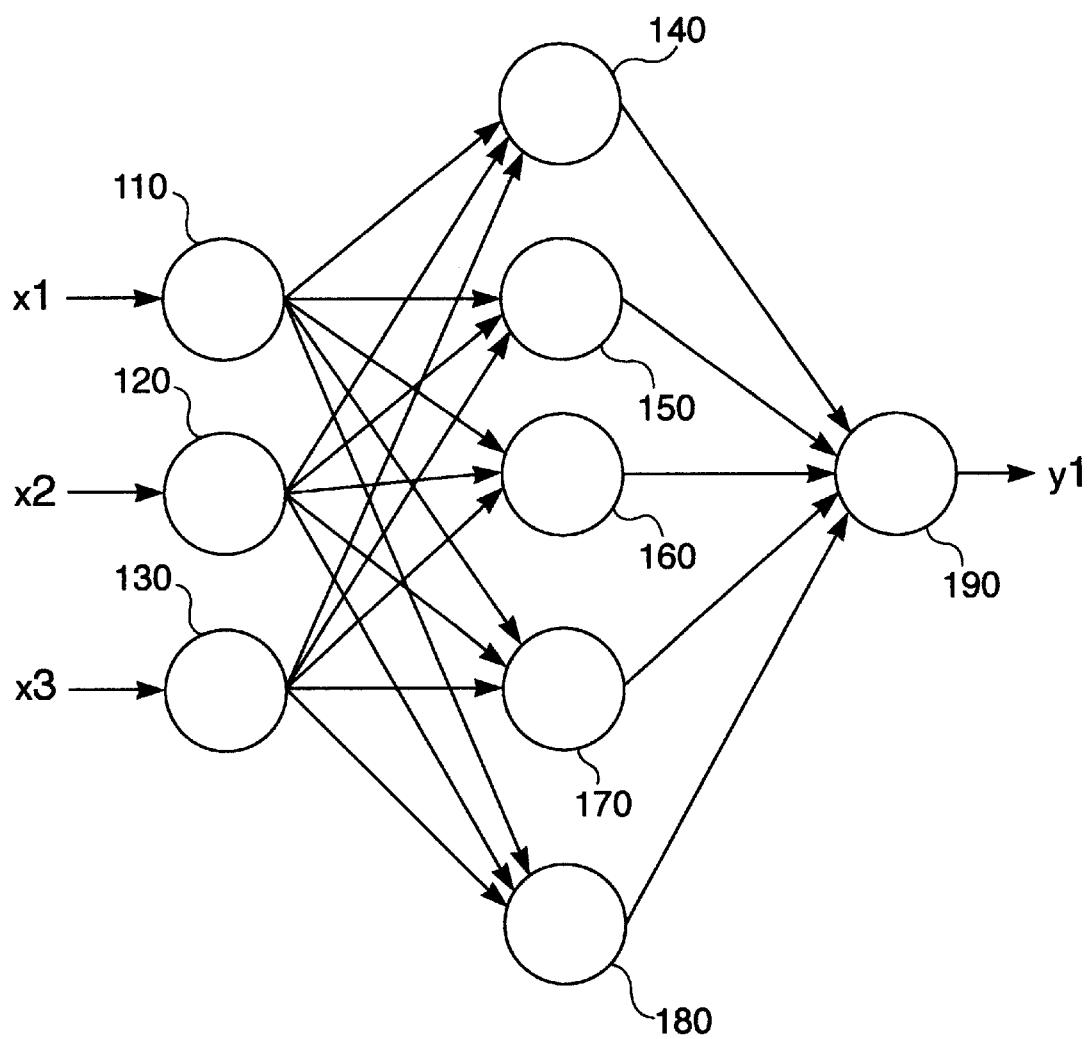
FIG. 1 is a diagram illustrating general Artificial Neural Network architecture.
Figure 2:
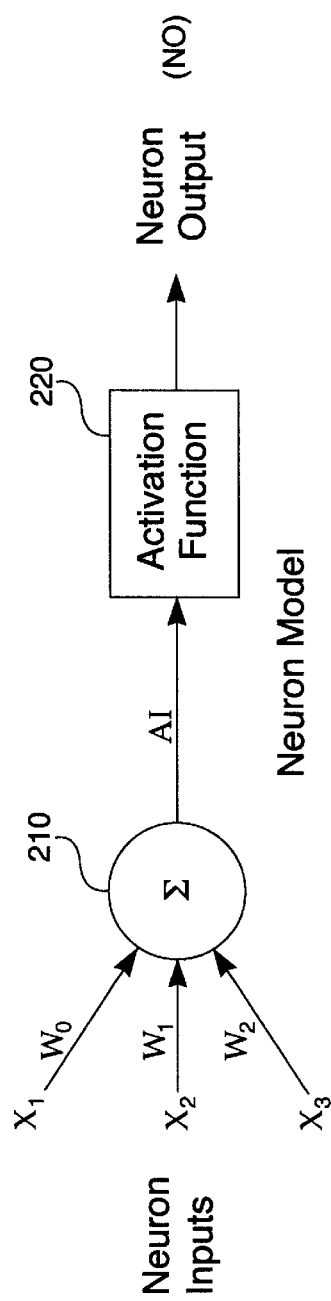
FIG. 2 is a diagram illustrating the architecture of a typical neuron.
Figure 2:
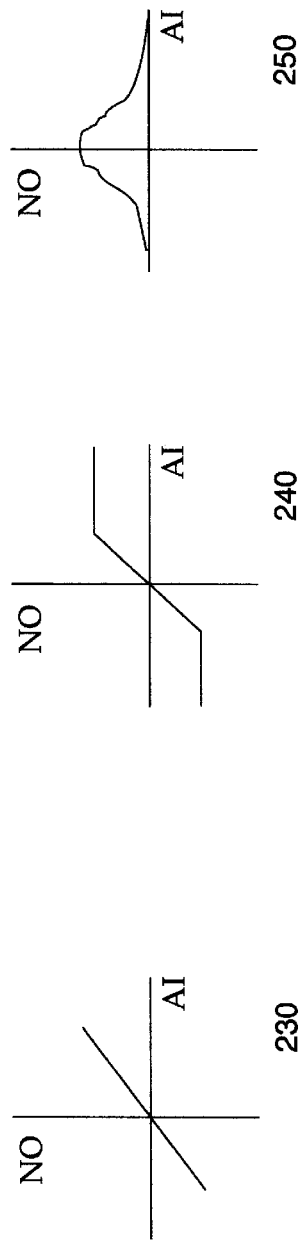

The control system of the present invention comprises an Artificial Neural Network incorporated into a voice coil motor dynamical system, where the structure comes from some error notations standard in voice coil motor control. Unlike adaptive voice coil motor control, where a regression matrix may be computed from the dynamics of the structure, the basis functions for the Artificial Neural Network controller can be derived from the physics of the voice coil motor structure.

The model for the voice coil motor is disclosed, for example, in Franklin, Powell and Workman, *Digital Control of Dynamic Systems*, 1990, which is incorporated herein by reference and is given by:

$$K_t I_c = J \, x'' + K_d x' + H(x'', x', x) \tag{1}$$

$$U_c(t) = L_c I'_c + R_c I_c + K_{bemf} x' \tag{2}$$

Where:
- $K_t$ is the torque constant matrix,
- J is the inertia matrix,
- $K_d$ is the viscous damping,
- H is the unmodeled, nonlinear voice coil motor dynamics such as bearing friction and stiction, and high frequency resonances,
- x" is the acceleration state,
- x' is the velocity state,
- x is position,
- $U_c$ is the current command,
- $I_c$ is the coil current,
- $L_c$ is the coil inductance,
- $R_c$ is the coil resistance, and
- $K_{bemf}$ represents voice coil motor back-emf constant.

For any given voice coil motor design, the physical properties are bounded by design and manufacturing specifications. The control objective is to provide a controller for the magnetic disk drive voice coil motor dynamics given by equations (1) and (2) based on inexact knowledge of the voice coil motor dynamics. To accomplish this, the voice coil motor tracking error e(t) is first defined as:

$$e(t) = x_d(t) - x(t) \quad (3)$$

Where $x_d(t)$ denotes the desired position trajectory. It is assumed that $x_d$ and its derivatives are bounded. Modifying the basic tracking error e(t) to include the error velocity, defines:

$$g(t) = \rho_1 e'(t) + \rho_2 e(t) \quad (4)$$

where $\rho_1$ and $\rho_2$ are scalar gains.

Using equations (1) and (4) the following equation can be derived:

$$Jg' NN_1 - K_d g - K_t I_c \quad (5)$$

Where $NN_1$ is a highly nonlinear function, representing the unmodeled mechanical modes of the voice coil motor.

A part of the controller design is a first Artificial Neural Network to estimate coil current $I_c$ of the voice coil motor, represented by $I_{est}$. Equation (5) may be rewritten as:

$$Jg' = NN_1 - K_d g - K_t I_{est} + K_t I_{err} \quad (6)$$

Where $I_{err}$ is the estimation error, which is the difference between the actual current and the estimated current.

The next feature of the controller design is a second Artificial Neural Network which will generate coil current control signal $U_c$ such that $I_{err}$ is minimized. To achieve this a dynamics equation in terms $I_{err}$ needs to be derived as follows:

$$I_{err} = I_{est} - I_c \quad (7)$$

Differentiating (7) and using equation (2) yields:

$$L_c I'_{err} = NN_2 - U_c \quad (8)$$

Where $NN_2$ represents the unmodeled, nonlinear electromechanical functions of the voice coil motor and associated power driver.

The role of the two Artificial Neural Networks in this design is to approximate the two complicated nonlinear functions $NN_1$ and $NN_2$. Notice that no dynamical analysis is needed as in typical adaptive control schemes. Thus, the controller of the present invention may be applied to many types of voice coil motor systems without modifications.

Refer back to FIG. 1, which illustrates the general architecture of a two layer artificial neural network. By collecting all the Artificial Neural Network weighting values $W_{ij}$ into matrices of weights $W^T$, the equation for the Artificial Neural Network output becomes:

$$Y = W^T \theta(x) \quad (9)$$

With the vector of activation functions:

$$\theta(x) = [\theta(x_1), \ldots, \theta(x_n)]^T \quad (10)$$

As disclosed in G. Cybenko, *Approximation by superpositions of a sigmodial function*, Math. Contr. Signals Syst., vol 2, no. 4, pp 303–314, 1989 (incorporated herein by reference), the Artificial Neural Network function approximation property states that a general nonlinear function C(x) can be approximated by:

$$C(x) = W^T \theta(x) + \phi(x) \quad (11)$$

The value $\phi(x)$ is called the Artificial Neural Network functional approximation error. The estimate of C(x) may be given by:

$$\overline{C}(x) = \overline{W}^T \theta(x) \quad (12)$$

where $\overline{C}$ is the estimate of the ideal Artificial Neural Network weights that is generated by an online weight tuning algorithm.

In designing an Artificial Neural Network to estimate the motor current $I_c$, the following equation may be used:

$$I_{est}[N\bar{N}_1 + k_2 g]/k_1 \quad (13)$$

Where $N\overline{N} = \overline{W} \theta_1$, and $k_1$ and $k_2$ are scaling constants. The weight estimates may be generated by the online weight tuning algorithm discussed below. Substituting equation (13) into equation (6) yields:

$$Jg'' K_d g = (I - K_t/k_1)(\overline{W}^T \theta_1) + \phi_1 + W_{1err}{}^T \theta_1 - K_t/k_1 k_2 g + K_t I_{err} \quad (14)$$

Where $W_{1err}{}^T \theta_1 W_1{}^T \theta_{1-\overline{w}_1} \theta_1 \quad (14)$ For the design of the control effort, $U_c$, the following equation may be selected:

$$U_c = N\bar{N}_2 + k_3 I_{err} \quad (15)$$

Where $N\overline{N}_2 = \overline{W}_2 \theta_2$, k>0. The weight estimates may be generated by an online weight tuning algorithm. Combining equation (15) and equation (8) yields:

$$L_c I'_{err} = \overline{W_{2err}}{}^T \theta_2 + \phi_2 - k_3 I_{err} \quad (16)$$

Let the desired position signal x(t) and it's derivatives be bounded. The control effort is given by equations (13), and (15). In order to allow online weight training, the weights may be updated according to the following equations:

$$\Delta \overline{W}_1 \beta_1 \theta_1 g^T - k_w \beta_1 \|([g^T I_{err}{}^T]^T)\| \overline{W}_1 \quad (17)$$

$$\Delta \overline{W}_2 = \beta_2 \theta_2 g^T - k_w \beta_2 \|([g^T I_{err}{}^T]^T)\| \overline{W}_2 \quad (18)$$

Where $\beta_1 = \beta_1{}^T$, $\beta_2 = \beta_2{}^T$ are positive constant matrices, and $k_w$ is a positive scalar constant. Notice that the weight tuning algorithm uses the system error states g and $I_{err}$. As the error states approach zero, the weight changes approach zero. This is novel when compared to conventional supervised learning methods which use training sets of input-output pairs and gradient-descent methods for weight update algorithms.

Thus, in the present invention, no matter what values are chosen for initial weight values (random numbers or even all zeros) the system will remain stable and train on-line to adjust the weight values. By carefully selecting scaling constants k1, k2, and k3, such that the system will be initially stable, no off-line training is required in the present invention.

Figure 3:
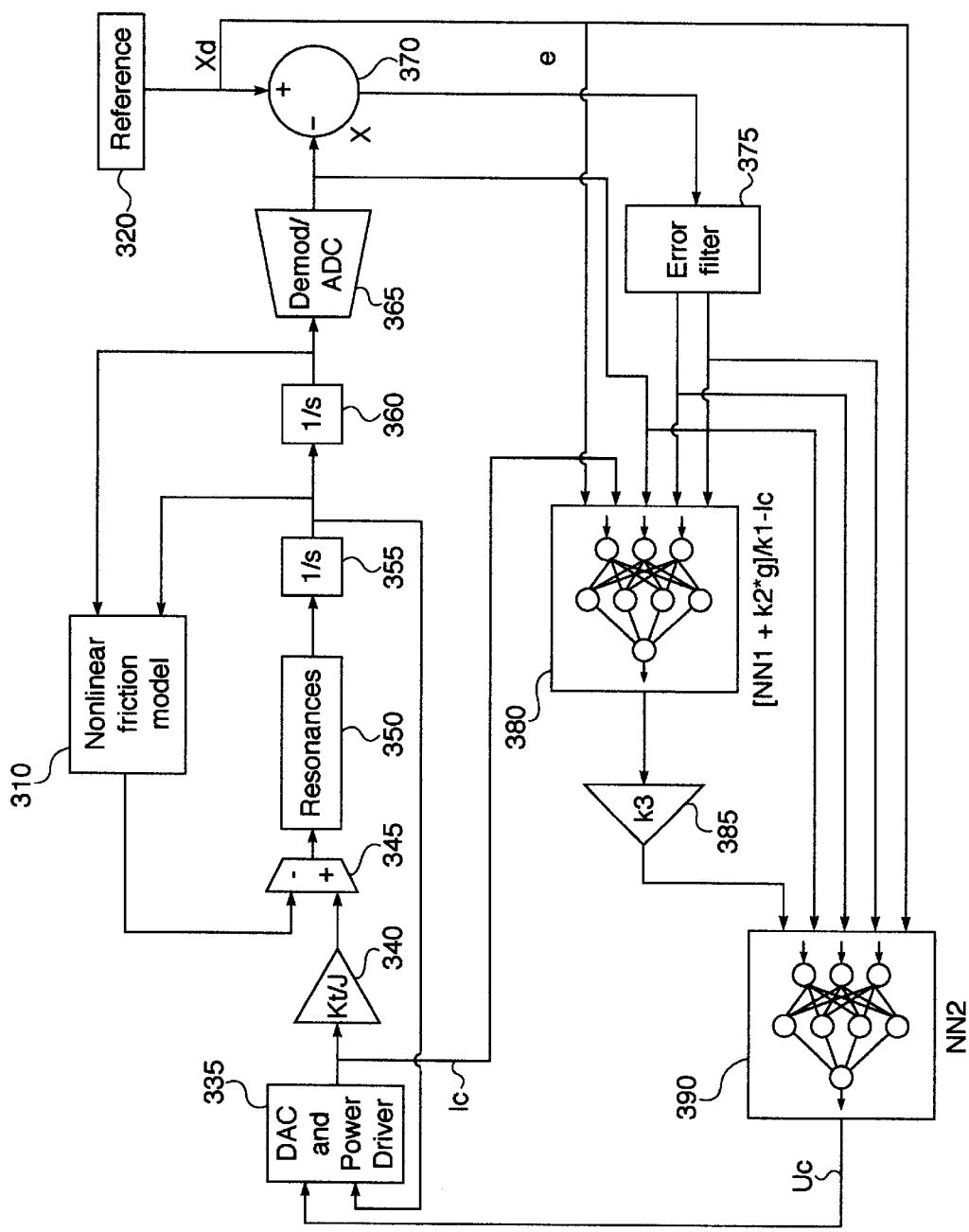
FIG. 3 is a functional block diagram of the Artificial Neural Network controller, modeling the response of magnetic disk drive voice coil motor in the preferred embodiment of the present invention.

FIG. 3 is a functional block diagram of the Artificial Neural Network controller, modeling the response of the magnetic disk drive voice coil motor in the preferred embodiment of the present invention. The diagram of FIG. 3 illustrates the characteristics of a hard disk drive as separate elements to aid in the understanding of how these elements affect disk drive is performance. In addition, the diagram of FIG. 3 illustrates how the present invention may be modeled using computer software to simulate operation of the Artificial Neural Network controller of the present invention.

Digital to analog converter (DAC) and power driver 335 receives digital control input signals including coil current command Uc, for the voice coil motor and outputs an analog control signal (coil current) Ic. Coil current signal Ic represents the current signal fed to the voice coil motor to control actuation of a read/write head control arm on a disk drive.

Block 340 (represented here schematically as an amplifier) modifies coil current signal Ic by multiplying the coil current signal by the torque constant matrix, $K_t$ divided by the inertia matrix J. Torque contrast matrix Kconverts the current signal Ic to torque. When divided by inertia matrix J, the resulting value represents an acceleration value for the voice coil motor and read/write head arm system.

The output of block 240 is fed to subtractor 345 with which subtracts from the output of block 240, the output from nonlinear friction model 310. Nonlinear friction model 310 may store parameters, a matrix, or function representing the nonlinear friction effects of the system such as from voice coil motor bearings, slipped disks and the like (e.g., nonlinear friction and stiction). The resultant signal therefor represents the acceleration value as modified by nonlinear friction values.

The output of subtractor 345 may be fed to block 350 which may emulate the high frequency resonances of the read/write head arm, as represented by the variable H in the equations given above. The output of block 350 may then be fed to integrators 355 and 365 to double integrate the resulting signal to produce a position reference. Note that the output of integrator 355 (a velocity value) may be used as an input signal to DAC and power driver 335 and Nonlinear friction model 310.

Demodulator and ADC 365 receives the resulting double integrated position signal from integrator 360 and demodulates the signal and converts it into digital form as signal X (position) for further processing. The output of Demodulator and ADC 365 may then be summed in adder 370 with reference position signal Xd to produce tracking error signal e. Reference signal Xd may represent the position of a target track, for example.

Error signal e may be fed to error filter 375 (See equation 4), the output of which may be fed to neural networks 380 and 390. The output of error filter 375 is used to update the weighting values of neural networks 380 and 390. Neural network 380 may receive other input signals including the position reference signal X output from Demodulator and ADC 365, position reference signal Xd, voice coil motor current signal Ic and error signal e.

Neural network 390 may receive the output of error filter 375 as well as other input signals including the position reference signal X output from Demodulator and ADC 365, position reference signal Xd, as well as the output of neural network 380, being passed through amplifier 385 which multiplies the output of neural network 380 by constant k3.

The output of neural network 390 is the coil current command signal Uc which in turn feeds DAC and power driver 335. As can be readily seen, the system is a closed loop, and the outputs of the neural networks are fed back into their inputs to produce a stable and adaptive system which does not require off-line training. In the Prior art, a system of training vectors (sample inputs and 'correct' outputs) would first be used to train the neural networks such that the networks would "know" the correct response ahead of time. In the present invention, however, no such training is required.

Figure 4:
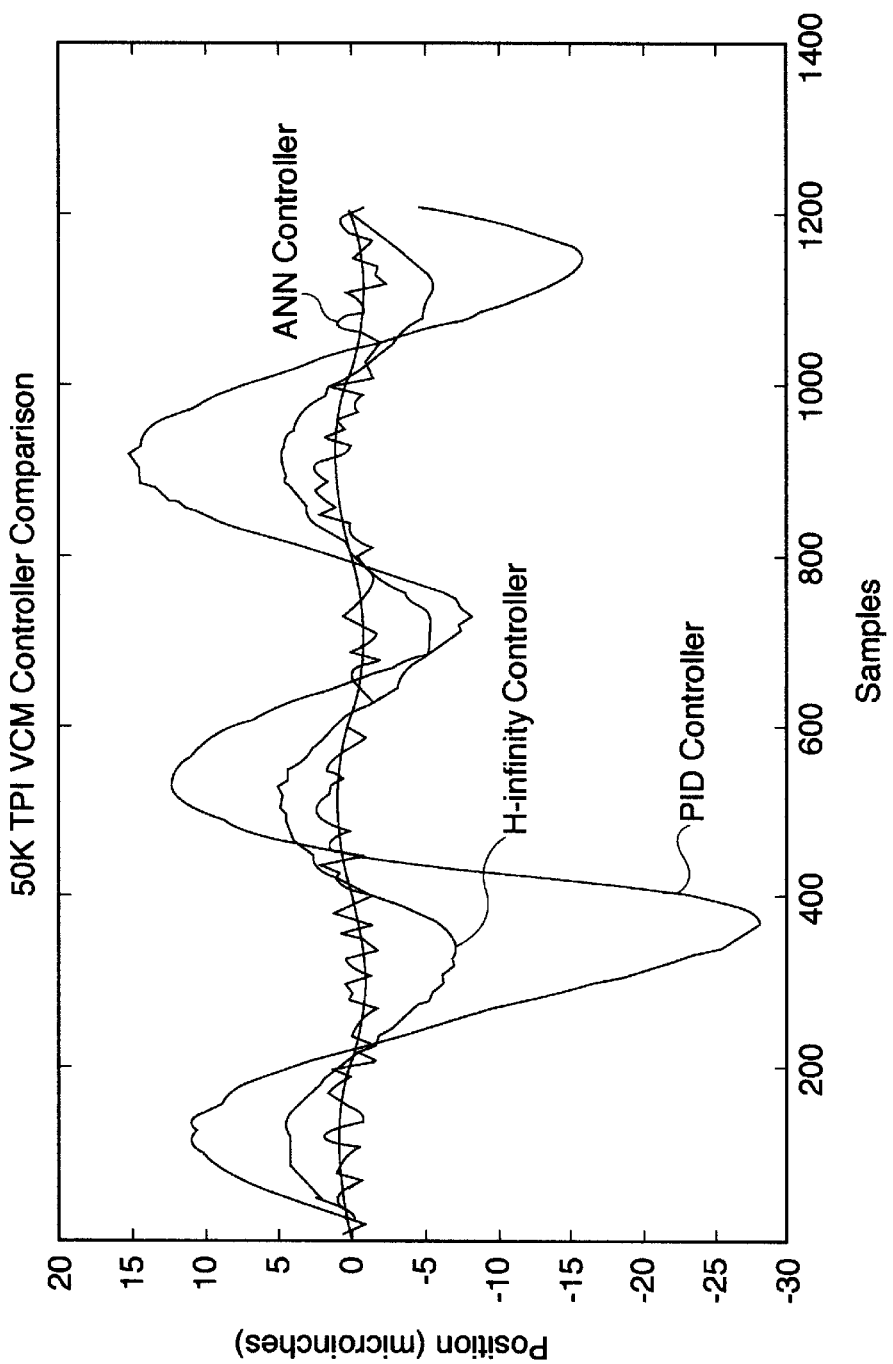
FIG. 4 is a graph illustrating tracking output of the plant of the preferred embodiment Artificial Neural Network controller in addition to two standard (prior art) linear controllers.
Figure 5:
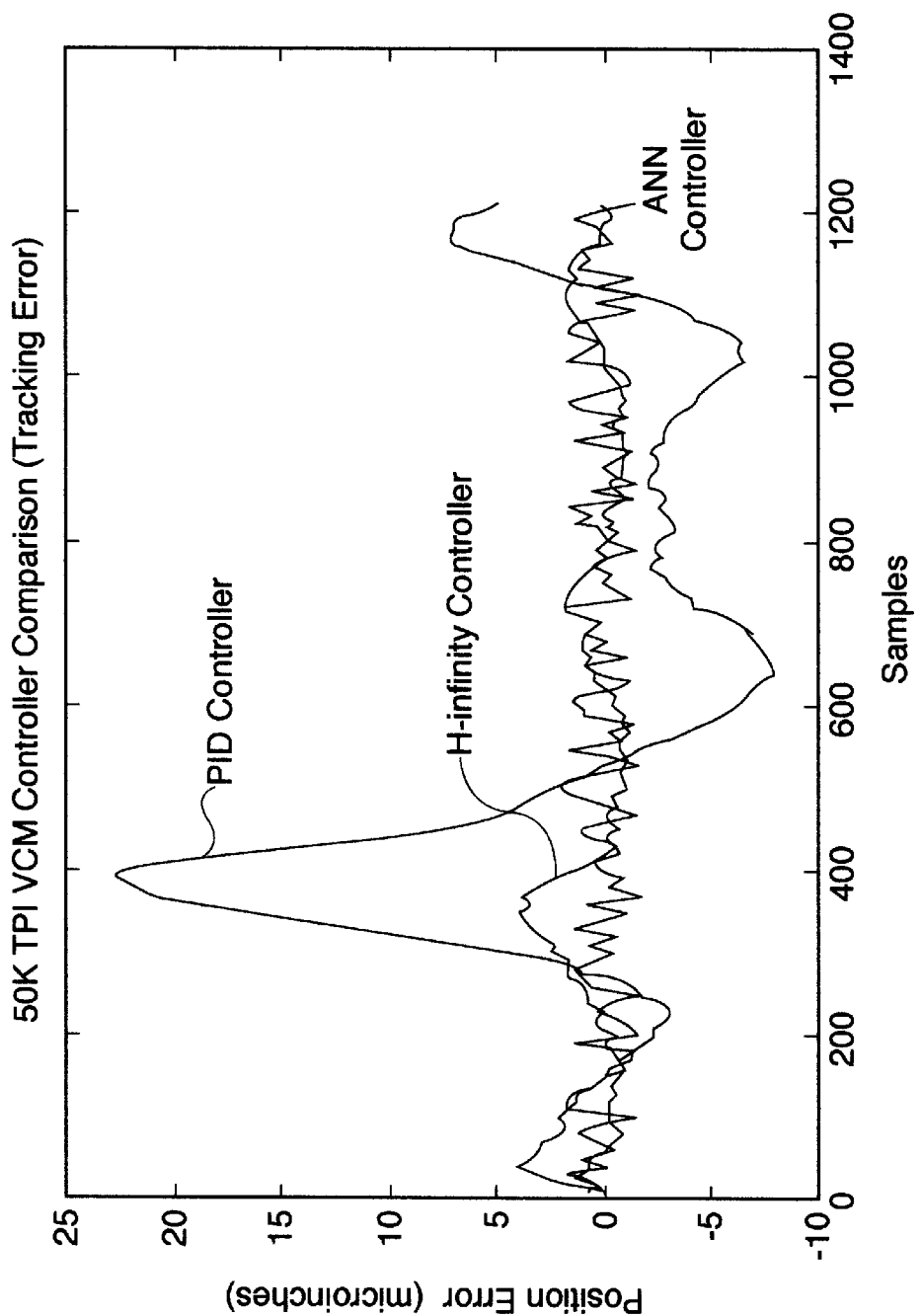
FIG. 5 is a graph illustrating tracking error of the preferred embodiment ANN controller in addition to two standard (prior art) linear controllers.

FIGS. 4 and 5 illustrate a simulation of a 50 K tpi magnetic disk drive VCM. FIGS. 4 and 5 show the results with a PID compensator, an H-infinity controller and finally the Artificial Neural Network controller. As it can be seen in FIGS. 4 and 5, the voice coil motor with a highly nonlinear friction model cannot be controlled well enough using a simple PID controller. The H-infinity controller does much better at attempting to follow the reference, but there is still a significant amount of tracking error.

The Artificial Neural Network controller shows excellent performance as the tracking error goes to a very small value. Each Artificial Neural Network may have a 4-input, 5-hidden, and 1-output neuron architecture. The Artificial Neural Network activation functions may comprise bipolar sigmoids.

Compared with conventional linear control techniques, the artificial neural net VCM controller of the present invention shows excellent tracking performance. Unlike conventional Artificial Neural Network controllers, this approach does not require off-line training or constant excitation for online training. Additionally, this Lyapunov stable control algorithm does not require exact knowledge of the voice coil motor dynamics. In fact, perfect knowledge of the voice coil motor parameters may be unattainable, (e.g. bearing friction is very difficult to model by conventional techniques).

Figure 6:
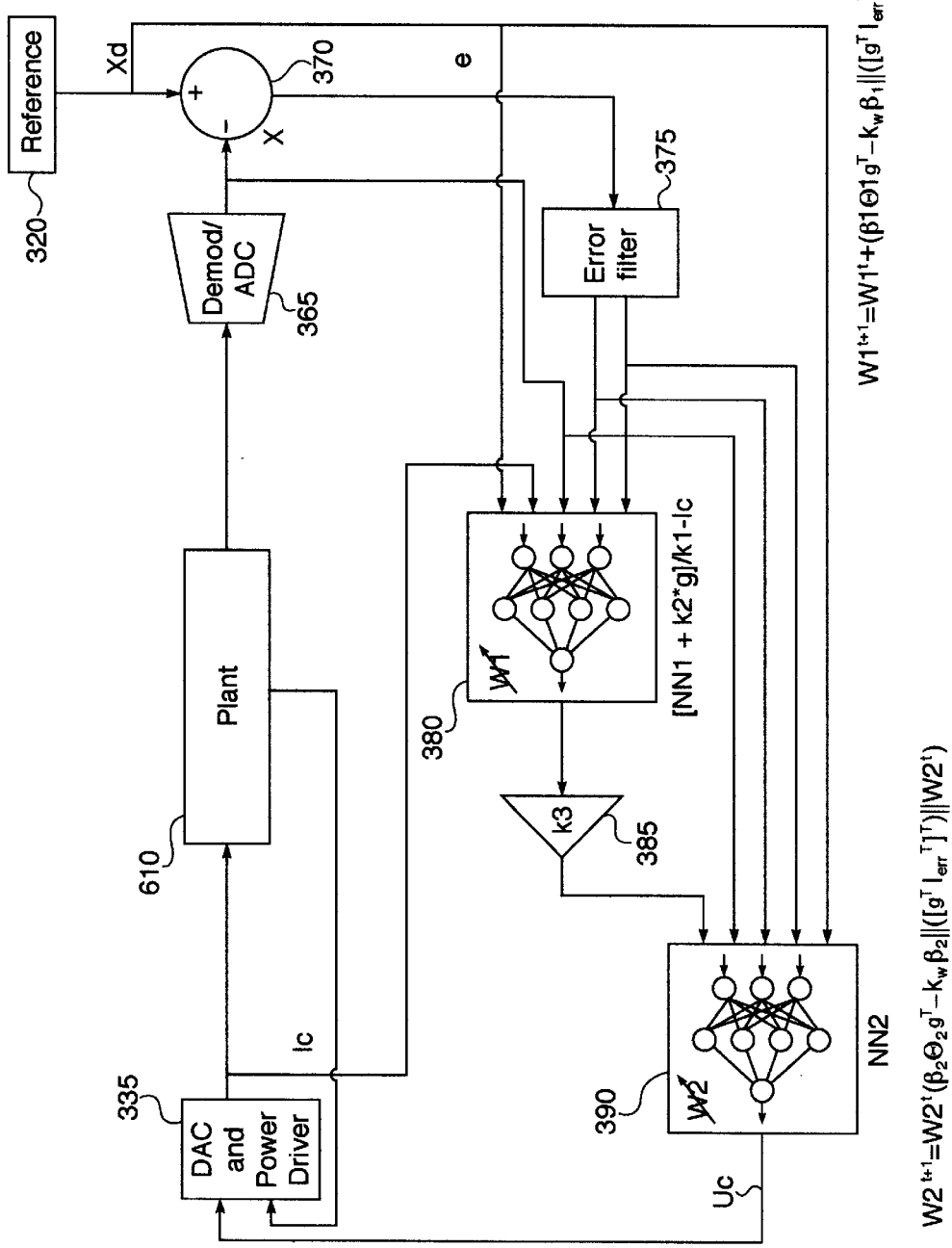
FIG. 6 is a functional block diagram of the Artificial Neural Network controller, as applied to an actual magnetic disk drive voice coil motor in the preferred embodiment of the present invention.

FIG. 6 is a functional block diagram of the Artificial Neural Network controller, as applied to an actual magnetic disk drive voice coil motor in the preferred embodiment of the present invention. Most of the elements of the diagram of FIG. 6 are the same as illustrated in FIG. 3 and thus need not be discussed in further detail here.

FIG. 6 represents an embodiment of the present invention as actually implements in a hard drive system, represented here by plant 660, as opposed to FIG. 3, which illustrates elements representing aspects of (or simulating aspects of) the hard drive system. FIG. 6 also illustrates how weighting values are applied from equations (17) and (18) to the first and second neural networks.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An artificial neural network controller for a magnetic disk drive voice coil motor having a reference signal and a position signal, the controller comprising:

a digital to analog converter and power driver for receiving a coil current control signal and converting the coil current control signal to a coil current signal;

a demodulator and analog to digital converter for receiving from the magnetic disk drive voice coil motor the position signal representing an actual position of a read/write head;

a subtractor, coupled to the demodulator and analog to digital converter, and receiving the position signal and the reference signal, for subtracting the position signal from the reference signal to generate an error signal;

an error filter, coupled to the subtractor, for receiving the error signal and generating a filtered error signal;

a first neural network, coupled to the error filter, and the demodulator and analog to digital converter, and receiving the reference signal, the position signal, the coil current signal, the error signal and the filtered error signal, for generating, according to a first dynamically adjustable set of weighted values, a first output control signal;

a multiplier, coupled to the first neural network, for multiplying the first output control signal by a predetermined weighted value; and a second neural network, coupled to the multiplier, the error filter, and the demodulator and analog to digital converter, and receiving the reference signal, the position signal, the multiplied first output control signal, the error signal and the filtered error signal, for generating, according to a second dynamically adjustable set of weighted values, the coil current signal.

2. The controller of claim 1, wherein the predetermined weighed value is selected such that the system is dynamically stable at startup without requiring off-line training of the first and second neural networks.

3. The controller of claim 2, wherein the filtered error signal comprises the error signal and an error velocity signal.

4. The controller of claim 3, wherein the filtered error signal further comprises the error signal multiplied by a scalar gain and the error velocity signal multiplied by a scalar gain.

5. The controller of claim 4, wherein the filtered error signal is given by:

$$g(t)=\rho_1 e'(t)+\rho_2 e(t)$$

where $\rho_1$ and $\rho_2$ are scalar gains, e(t) is the error signal and e'(t) is the error velocity signal.

6. The controller of claim 5, wherein the first neural network generates an estimate of coil current $I_c$ of the voice coil motor, represented by $I_{est}$, defined by:

$$Jg'=NN_1-K_d g-K_t I_{est}+K_t I_{err}$$

where $I_{err}$ is the estimation error, which is the difference between the actual current and the estimated current, g is the filtered error signal, J is the inertia matrix, g' is a derivative of the filtered error signal, $NN_1$ is a highly nonlinear function of the first neural network representing the unmodeled mechanical modes of the voice coil motor, $K_d$ is the viscous damping, and $K_t$ is the torque constant matrix.

7. The controller of claim 6, wherein the second neural network which generates the coil current control signal $U_c$ such that $I_{err}$ is minimized and $I_{err}$ is derived as follows:

$$I_{err}=I_{est}-I_c$$

where $I_c$ is the voice coil motor current and $I_{est}$ is the estimate of voice coil motor current.

8. The controller of claim 7, wherein the function of the second neural network $NN_2$ is defined by:

$$L_c I'_{err}=NN_2=U_c$$

where $NN_2$ represents the unmodeled, nonlinear electromechanical functions of the voice coil motor and the power driver.

9. The controller of claim 8, wherein the estimated voice coil motor current is determined by:

$$I_{est}=[N\bar{N}_1+k_2 g]/k_1$$

where $N\bar{N}=\bar{W}\theta_1$, and $k_1$ and $k_2$ are scaling constants.

10. The controller of claim 9, wherein the dynamically adjustable weighting values for the first neural network are determined by:

$$\Delta\bar{W}_1=\beta_1\theta_1 g^T-k_w\beta_1\|([g^T I_{err}{}^T]^T)\|\bar{W}_1$$

where the desired position signal x(t) and its derivatives are bounded and $\beta_1=$, $\beta_1{}^T$, $\beta_2=\beta_2{}^T$ are positive constant matrices, and $k_w$ is a positive scalar constant.

11. The controller of claim 10, wherein the dynamically adjustable weighting values for the second neural network are determined by:

$$\Delta\bar{W}_2=\beta_2\theta_2 g^T-k_w\beta_2\|([g^T I_{err}{}^T]^T)\|\bar{W}_2$$

where the desired position signal x(t) and its derivatives are bounded and $\beta_{1=\beta_1}{}^T$, $\beta_2=\beta_2{}^T$ are positive constant matrices, and $k_w$ is a positive scalar constant.

12. The controller of claim 1, wherein the dynamically adjustable set of weighting values of the first and second artificial networks are initialized to zero while the system remains stable.

13. A method of operating an artificial neural network controller for a magnetic disk drive voice coil motor having a reference signal and a position signal, the method comprising the steps of:

receiving in a digital to analog converter and power driver, a coil current control signal and converting the coil current control signal to a coil current signal, receiving, in a demodulator and analog to digital converter, a position signal from the magnetic disk drive voice coil motor, the position signal representing an actual position of a read/write head, subtracting, in a subtractor, the position signal from the reference signal to generate an error signal, filtering, in an error filter coupled to the subtractor, the error signal to generate a filtered error signal;

generating, according to a first dynamically adjustable set of weighted values, a first output control signal in a first neural network coupled to the error filter and the demodulator and analog to digital converter, from the reference signal, the position signal, the coil current signal, the error signal and the filtered error signal, multiplying, in a multiplier coupled to the first neural network, the first output control signal by a predetermined weighted value, and generating, according to a second dynamically adjustable set of weighted values, the coil current signal in a second neural network coupled to the multiplier, the error filter, and the demodulator and analog to digital converter, from the reference signal, the position signal, the multiplied first output control signal, the error signal and the filtered error signal.

14. The method of claim 13, wherein the predetermined weighed value is selected such that the system is dynamically stable at startup without requiring off-line training of the first and second neural networks.

15. The method of claim 14, wherein the filtered error signal comprises the error signal and an error velocity signal.

16. The method of claim 15, wherein the filtered error signal further comprises the error signal multiplied by a scalar gain and the error velocity signal multiplied by a scalar gain.

17. The method of claim 16, wherein the filtered error signal is given by:

$$g(t)=\rho_1 e'(t)+\rho_2 e(t)$$

where $\rho_1$ and $\rho_2$ are scalar gains, e(t) is the error signal and e'(t) is the error velocity signal.

18. The method of claim 17, wherein said step of generating, according to a first dynamically adjustable set of weighted values, a first output control signal in a first neural network comprises the step of generating, in the first neural network, an estimate of coil current $I_c$ of the voice coil motor, represented by $I_{est}$, defined by:

$$Jg'=NN_1-K_dg-K_tI_{est}+K_tI_{err}$$

where $I_{err}$ is the estimation error, which is the difference between the actual current and the estimated current, g is the filtered error signal, J is the inertia matrix, g' is a derivative of the filtered error signal, $NN_1$ is a highly nonlinear function of the first neural network representing the unmodeled mechanical modes of the voice coil motor, $K_d$ is the viscous damping, and $K_t$ is the torque constant matrix.

19. The method of claim 18, wherein said step of generating, according to a second dynamically adjustable set of weighted values, the coil current signal in a second neural network comprises the step of generating, in the second neural network, the coil current control signal $U_c$ such that $I_{err}$ is minimized and $I_{err}$ is derived as follows:

$$I_{err}=I_{est}-I_c$$

where $I_c$ is the voice coil motor current and $I_{est}$ is the estimate of voice coil motor current.

20. The method of claim 19, wherein the function of the second neural network $NN_2$ is defined by:

$$L_cI'_{err}=NN_2U_c$$

where $NN_2$ represents the unmodeled, nonlinear electromechanical functions of the voice coil motor and the power driver.

21. The method of claim 20, wherein the estimated voice coil motor current is determined by:

$$I_{est}=[N\tilde{N}_1+k_2g]/k_1$$

where $N\overline{N}=\overline{W}\theta_1$, and $k_1$ and $k_2$ are scaling constants.

22. The method of claim 21, wherein the dynamically adjustable weighting values for the first neural network are determined by:

$$\Delta \overline{W}_1\beta_1\theta_1g^T-k_w\beta_1\|([^TI_{err}{}^T]^T)\|\overline{W}_1$$

where the desired position signal x(t) and its derivatives are bounded and $\beta_1=\beta^{1T}$, $\beta_2=\beta_2{}^T$ are positive constant matrices, and $k_w$ is a positive scalar constant.

23. The method of claim 21, wherein the dynamically adjustable weighting values for the second neural network are determined by:

$$\Delta \overline{W}_2=\beta_2\theta_2g^T-k_w\beta_2\|([g^TI_{err}{}^T]^T)\|\overline{W}_2$$

where the desired position signal x(t) and its derivatives are bounded and $\beta_1=\beta_1{}^T$, $\beta_2=\beta_2{}^T$ are positive constant matrices, and $k_w$ is a positive scalar constant.

24. The method of claim 13, wherein the dynamically adjustable set of weighting values of the first and second artificial networks are initialized to zero while the system remains stable.

* * * * *